United States Patent
Fu et al.

(10) Patent No.: US 7,254,173 B1
(45) Date of Patent: Aug. 7, 2007

(54) DIGITALLY ADJUSTED HIGH SPEED ANALOG EQUALIZER

(75) Inventors: Wei Fu, San Diego, CA (US); Joseph James Balardeta, Carlsbad, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 759 days.

(21) Appl. No.: 10/394,844

(22) Filed: Mar. 21, 2003

(51) Int. Cl.
*H03H 7/40* (2006.01)
(52) U.S. Cl. .................. 375/233; 375/350; 708/323
(58) Field of Classification Search ............... 375/229, 375/230, 232, 233, 346, 348, 350; 708/322, 708/323
See application file for complete search history.

(56) References Cited

U.S. PATENT DOCUMENTS 6,795,494 B1 * 9/2004 Phanse et al. ............... 375/219
6,975,678 B1 * 12/2005 Le et al. ..................... 375/232
7,003,228 B2 * 2/2006 Wang et al. .................. 398/85

* cited by examiner

*Primary Examiner*—Dac V. Ha
(74) *Attorney, Agent, or Firm*—Incaplaw; Terrance A. Meador

(57) ABSTRACT

A high speed CMOS-implemented equalizer architecture as described herein utilizes a digitally controlled analog equalization scheme to equalize intersymbol interference present in an input signal. The equalizer structure includes an inductor high frequency gain boosting stage and a feed forward high frequency equalizer stage connected in series. The equalization performed by each of these gain boosting stages is controlled by one or more digital control signals. The combination of these stages results in the equalization of both amplitude and phase distortion. The equalizer architecture is suitable for use with communication systems that operate at 11.2 Gbps speeds.

20 Claims, 4 Drawing Sheets

US 7,254,173 B1

DIGITALLY ADJUSTED HIGH SPEED ANALOG EQUALIZER

FIELD OF THE INVENTION

The present invention relates generally to electronic circuits. More particularly, the present invention relates to high speed equalizers such as those utilized in telecommunication and data communication systems.

BACKGROUND OF THE INVENTION

Intersymbol interference ("ISI") can be a significant source of error that adversely affects the data transmission speed and reliability of high speed communication applications such as OC-192 and 10 Gb Ethernet systems. The ISI is caused by imperfect communication channel conditions, such as lossy transmission lines and connectors.

The prior art is replete with various equalization techniques that address the problem of ISI. Both analog and digital equalizers have been developed, with the digital approach generally providing easier control, lower speed, and higher power operation. On the other hand, analog solutions generally result in higher speed and lower power operation. Unfortunately, prior art approaches, whether digital or analog, are limited to applications below the Gigabit per second range, especially for CMOS implementations.

BRIEF SUMMARY OF THE INVENTION

A practical implementation of the invention is an 11.2 Gbps non return to zero ("NRZ") data equalizer with a digital adjustment feature. The equalizer is configured to equalize ISI in the analog domain, where the strength of the equalization is controlled in the digital domain. A system level digital search method can be utilized to determine the current or optimum equalization settings. The equalizer can be realized as a CMOS implementation in a manner that achieves high speed and low cost operation.

The above and other aspects of the present invention may be carried out in one form by an equalizer circuit comprising: an input amplifier stage configured to amplify an input signal into a first intermediate signal; an inductor gain boosting equalizer connected to receive the first intermediate signal, the inductor gain boosting equalizer being configured to provide high frequency gain boosting to the first intermediate signal, in response to a first digital control signal, resulting in a second intermediate signal; and a feed forward equalizer stage connected to receive the second intermediate signal, the feed forward equalizer stage being configured to provide high frequency gain boosting and phase distortion correction to the second intermediate signal, in response to a second digital control signal, resulting in an output signal. The combination of the two equalizer stages is capable of correcting for amplitude and phase distortion.

BRIEF DESCRIPTION OF THE DRAWINGS

A more complete understanding of the present invention may be derived by referring to the detailed description and claims when considered in conjunction with the following Figures, wherein like reference numbers refer to similar elements throughout the Figures.

DETAILED DESCRIPTION OF A PREFERRED EMBODIMENT

The present invention may be described herein in terms of functional block components and various processing steps. It should be appreciated that such functional blocks may be realized by any number of hardware, software, and/or firmware components configured to perform the specified functions. In addition, those skilled in the art will appreciate that the present invention may be practiced in conjunction with any number of communication systems and that the particular amplifier circuit arrangement described herein is merely one exemplary application for the invention.

It should be appreciated that the particular implementations shown and described herein are illustrative of the invention and its best mode and are not intended to otherwise limit the scope of the invention in any way. Indeed, for the sake of brevity, conventional aspects of the circuits (and the individual operating components of the circuits) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical embodiment.

The following description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits are not adversely affected).

As used herein, a "node" means any internal or external reference point, connection point, junction, signal line, conductive element, or the like at which a given signal, logic level, voltage, data pattern, current, or quantity is present. Furthermore, two or more nodes may be realized by one physical element (and two or more signals can be multiplexed, modulated, or otherwise distinguished even though received or output at a common node).

Figure 1:
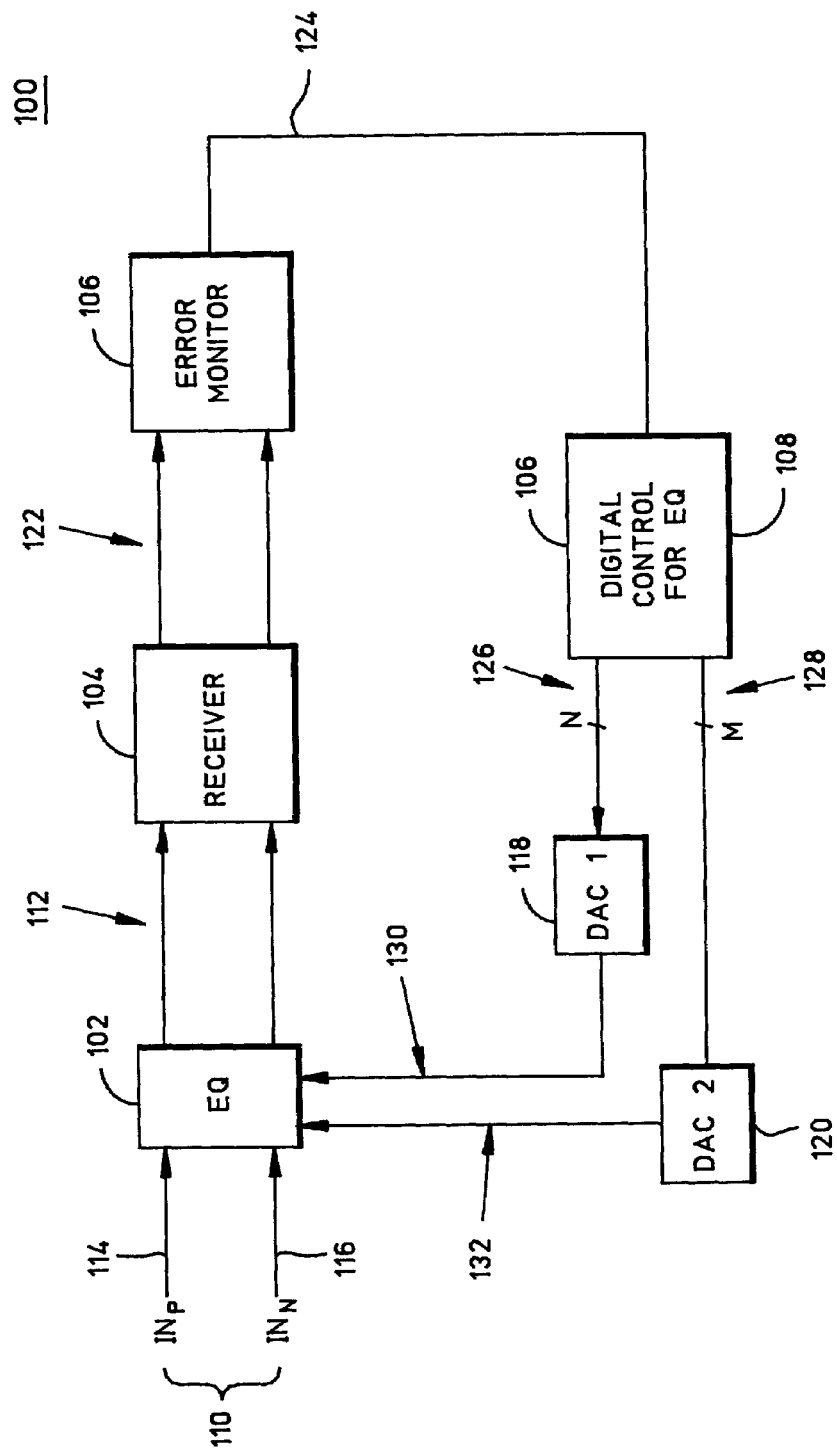
FIG. 1 is a block diagram of an equalizer architecture suitable for use with a communication system.

FIG. 1 is a high level schematic representation of an equalizer architecture 100 suitable for use with an equalizer circuit 102. This architecture 100 also includes at least a receiver component 104 connected to equalizer circuit 102, an error monitor 106 connected to receiver component 104, and a digital control component 108 connected to error monitor 106. In accordance with one practical implementation, equalizer circuit 102 is realized on a single chip or semiconductor substrate, the error monitor 106, and the digital control component 108 are realized "off chip" or external to the chip upon which equalizer circuit 102 is formed. The general scheme depicted in FIG. 1 can be deployed in the context of a number of practical applications. For example, in accordance with one practical application, the architecture 100 is utilized in an optical communication system that supports data rates of up to 11.2 Gbps.

The equalizer circuit/arrangement 102 receives an input data signal 110, and equalizes the input signal into an equalized output data signal 112. In FIG. 1, input data signal 110 is depicted as a differential signal having a positive component 114 and a negative component 116, and output data signal 112 is also depicted as a differential signal. Architecture 100 also includes a first digital-to-analog converter ("DAC") 118 and a second DAC 120, both of which are connected to equalizer circuit 102. In a practical embodiment, DAC 118 and DAC 120 can be realized on the same semiconductor chip upon which equalizer circuit 102 is formed. Equalizer circuit 102 includes a digitally-controlled equalization structure (not shown in FIG. 1) that is responsive to the analog outputs of DAC 118 and DAC 120.

Equalizer circuit 102 can be employed to increase the level of the input data signal 110 for compatibility with receiver component 104, which may require a minimum input signal amplitude for proper and/or reliable operation. In practical embodiments, the receiver component 104 processes its input signal in accordance with the system or subsystem requirements. For example, receiver component 104 may be a timing and data recovery receiver. The input signal for receiver component 104 is based on the equalized output data signal 112 (in the example embodiment, output data signal 112 corresponds to the input signal for receiver component 104). Receiver component 104 generates a receiver output signal 122 (depicted as a differential signal) in response to the receiver input signal. Notably, if the equalized output data signal 112 contains excessive ISI, then errors may be introduced into the signal processed by receiver component 104.

Error monitor 106 is configured to measure an error metric, such as the bit error rate or other data error quantity, associated with the receiver output signal 122. In lieu of the bit error rate, the error metric may be derived from the output of a CDR component, which can be analyzed for ISI or other characteristics. Error monitor 106 may incorporate known techniques and processes to generate an error indication 124 that represents the error metric. Digital control component 108 receives and processes error indication 124 (or a signal derived from error indication 124) to generate at least one digital control signal. In the example embodiment, the digital control component 108 generates a first digital control signal 126 and a second digital control signal 128. During normal operation, the digital control signals 126/128 are generated in response to the error metric measured by error monitor 106. In a preferred practical embodiment, digital control component 108 is implemented in software, which facilitates use of a flexible digital search algorithm at the system or subsystem level. Digital control component 108 may be a programmable software element or module, or a component that is configured to facilitate "manual" adjustment or setting. A manual adjustment feature may be desirable for purposes of initialization, calibration, or diagnostics.

In the practical embodiment, digital control signal 126 is an N-bit digital word, and digital control signal 128 is an M-bit digital word (N and M may, but need not, be equal). The values of N and M are selected according to the desired equalizer adjustment resolution and/or other application-specific requirements. In accordance with typical embodiments, the digital control signals are digital words having 3-8 bits. As described in more detail below, digital control signal 126 regulates the weighted sum of an amplified signal generated by an inductor gain boosting equalizer and an amplified signal generated by a resistor gain stage of the equalizer circuit 102, while digital control signal 128 regulates the weighted difference of an amplified signal and a feed-forward signal generated by a feed forward equalizer stage of the equalizer circuit 102.

DAC 118 receives digital control signal 126 (or a digital signal derived from control signal 126) and converts the signal into at least one suitable analog equalizer control signal 130 that is utilized by the equalization structure in equalizer circuit 102. DAC 120 receives digital control signal 128 (or a digital signal derived from control signal 128) and converts the signal into at least one suitable analog equalizer control signal 132 that is also utilized by the equalization structure in equalizer circuit 102. The DACs employ conventional design techniques and, for the sake of brevity, well known aspects of their operation are not described herein. In the practical embodiment, each of the analog control signals 130/132 may have multiple components, and each can be utilized to control one or more bias current transistors in equalizer circuit 102.

In operation, the equalizer architecture 100 (equalizer circuit 102 in particular) receives and equalizes the input data signal 110 to produce the equalized output data signal 112. The equalizer circuit 102 functions to amplify the input data signal 110 while boosting the high frequency gain and correcting phase distortion to address the ISI in the input signal 110. In the example embodiment, the equalizer circuit 102 "removes" the ISI by introducing a specific amount of high frequency gain and by correcting for phase distortion. The amount of high frequency gain and the phase distortion compensation are controlled by DACs 118/120, which are controlled by digital control component 108.

The equalized output data signal 112 may be further processed by receiver component 104, and the output of receiver component 104 is analyzed by error monitor 106 to measure an error metric. The error metric indicates the quality of the receiver output and, in turn, the quality of output data signal 112. For example, ISI in output data signal 112 results in measurable data errors, and, therefore, the error metric is indicative of the amount of ISI present in output data signal 112.

The error metric is processed by digital control component 108, which generates digital control signals 126/128 in response to the error metric. The digital control signals 126/128 are respectively converted by DACs 118/120 into analog control signals 130/132, which in turn control the equalization scheme of equalizer circuit 102. In this manner, a feedback control scheme may be utilized to maintain adequate equalization of the input signal 110.

Figure 2:
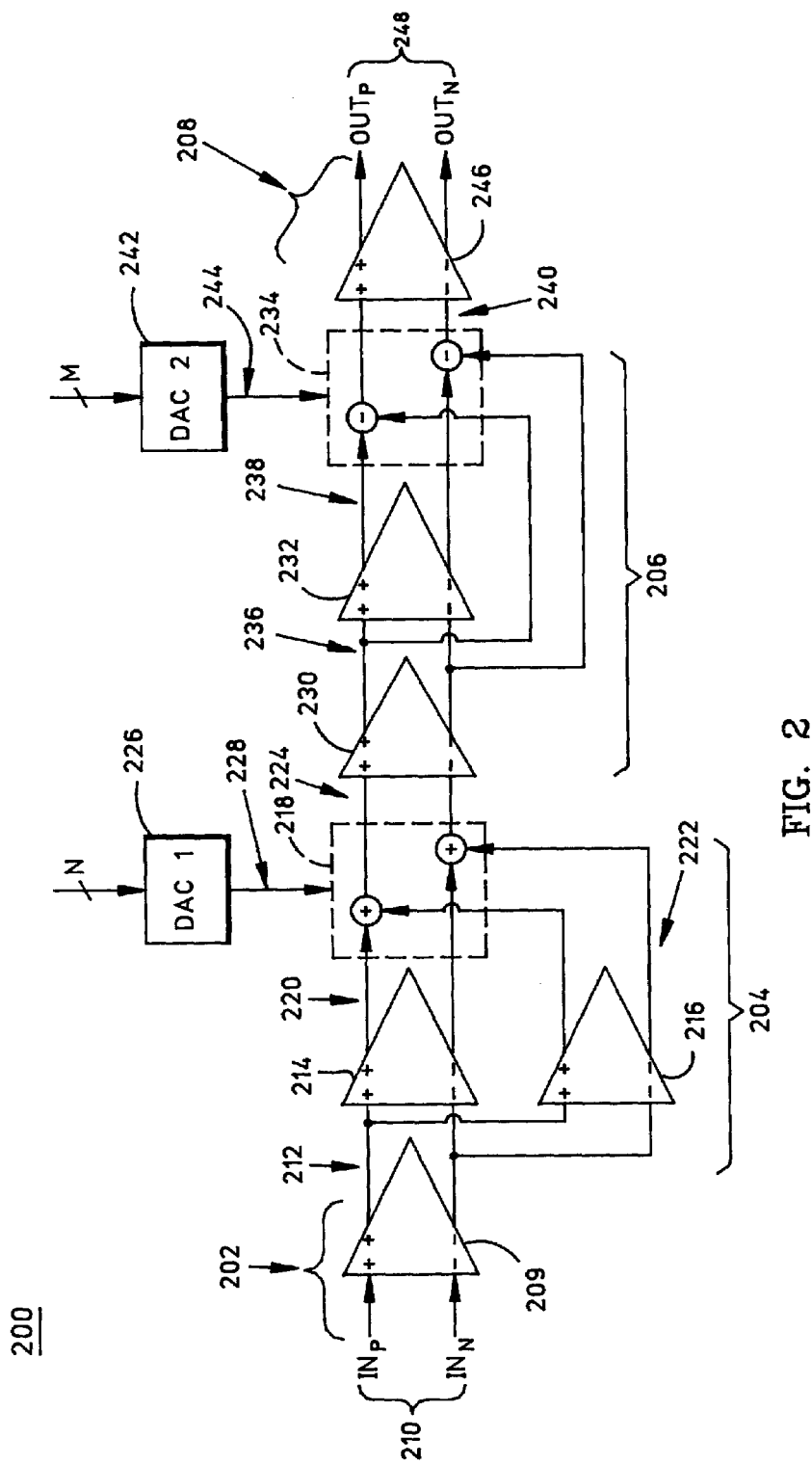
FIG. 2 is a schematic representation of an equalizer circuit suitable for use with the equalizer architecture shown in FIG. 1.

FIG. 2 is a schematic representation of an equalizer circuit 200 suitable for use with the equalizer architecture shown in FIG. 1. Equalizer circuit 200 generally includes an input amplifier stage 202, an inductor gain boosting stage 204 connected to the input amplifier stage 202, a feed forward equalizer stage 206 connected to the inductor gain boosting stage 204, and an output amplifier stage 208 connected to the feed forward equalizer stage 206.

The input amplifier stage 202 is realized as a differential amplifier 209 that receives a differential input signal 210. In one practical embodiment, input amplifier stage 202 provides a gain of approximately two. The purpose of the input amplifier stage 202 is to isolate the inductor gain boosting stage 204. The input amplifier stage 202 amplifies the input signal 210 into a first intermediate signal 212.

The inductor gain boosting stage 204 generally includes a differential inductor gain amplifier 214 configured to provide an inductor gain path corresponding to high frequency gain boosting, a differential resistor gain amplifier 216 configured to provide a resistor gain path having no high frequency gain boosting, and a differential summer 218. As shown in FIG. 2, inductor gain amplifier 214 and resistor gain amplifier 216 both receive the first intermediate signal 212 as a common input. The inductor gain amplifier 214 is configured to provide high frequency gain boosting to amplify the first intermediate signal 212 into an equalized signal 220. In contrast, the resistor gain amplifier 216 is configured to provide a suitable gain with a flat frequency response to amplify the first intermediate signal 212 into an amplified signal 222.

Summer 218 receives the equalized signal 220 as one input and the amplified signal 222 as another input, and generates a second intermediate signal 224 that represents a weighted sum of the equalized signal 220 and the amplified signal 222. The second intermediate signal 224 can be equivalent to the equalized signal 220 (i.e., the sum represents a 100% weighting of the equalized signal 220 and a 0% weighting of the amplified signal 222), equivalent to the amplified signal 222 (i.e., the sum represents a 100% weighting of the amplified signal 222 and a 0% weighting of the equalized signal 220), or equivalent to any weighted combination of the two.

A first DAC 226, which may be realized as part of the equalizer circuit 200, is connected to the summer 218. The DAC 226 receives an N-bit digital word and converts it into at least one analog control signal 228. The analog signal(s) 228 generated by the first DAC 226 determine the relative weighting of the equalized signal 220 and the amplified signal 222 in the second intermediate signal 224.

The inductor gain boosting stage 204 provides high frequency gain boosting by creating a left-hand zero associated with its frequency response. The high frequency gain boosting compensates for ISI in the input signal 210.

The feed forward equalizer stage 206 generally includes a differential resistor gain amplifier 230, at least one differential resistor gain amplifier 232 connected to the resistor gain amplifier 230, and a differential subtractor 234 connected to the amplifier 232. The second intermediate signal 224 serves as an input to the amplifier 230, which amplifies the second intermediate signal 224 into a third intermediate signal 236. The third intermediate signal 236 serves as an input to the amplifier 232, which amplifies the third intermediate signal 236 into a fourth intermediate signal 238. A practical embodiment can include any number of additional series amplifier stages connected between amplifier 232 and subtractor 234. For the sake of clarity and brevity, FIG. 2 depicts only one amplifier bypassed by the feed forward path.

Subtractor 234 receives the fourth intermediate signal 238 as its positive input and the third intermediate signal 236 as its negative input. The subtractor 234 is configured to generate a fifth intermediate signal 240 that represents a weighted difference of the fourth intermediate signal 238 and the third intermediate signal 236. The fifth intermediate signal 240 can be equivalent to the fourth intermediate signal 238 at one extreme (i.e., the difference represents the fourth intermediate signal 238 minus a 0% contribution of the third intermediate signal 236). Typically, the fifth intermediate signal 240 represents the fourth intermediate signal 238 minus some portion or contribution of the third intermediate signal 236.

A second DAC 242, which may be realized as part of the equalizer circuit 200, is connected to the subtractor 234. The DAC 242 receives an M-bit digital word and converts it into at least one analog control signal 244. The analog signal(s) 244 generated by the second DAC 242 determine the relative weighting of the third intermediate signal 236 and the fourth intermediate signal 238 in the fifth intermediate signal 240.

The feed forward equalizer stage 206 provides high frequency gain boosting. The high frequency gain boosting further compensates for ISI in the input signal 210. In addition, the feed forward equalizer stage 206 compensates for phase distortion introduced by the inductor gain boosting stage 204.

The output amplifier stage 208 is realized as a differential amplifier 246 that receives the fifth intermediate signal 240 as an input and generates an output signal 248 for the equalizer circuit 200. The purpose of the output amplifier stage 208 is to provide a low output impedance for the next system/subsystem component (not shown).

Figure 3:
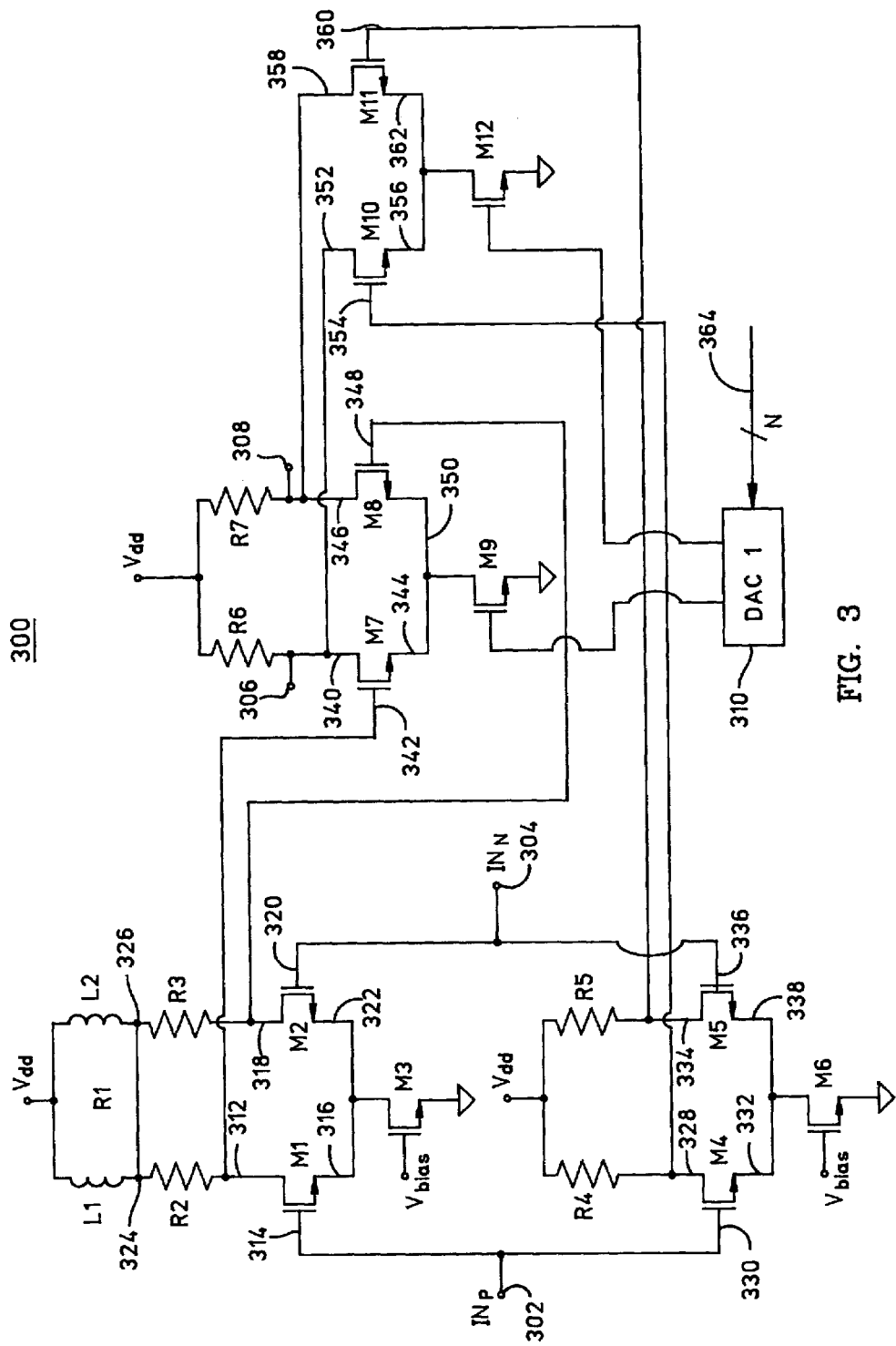
FIG. 3 is a schematic representation of an inductor gain boosting stage of an equalizer circuit.

FIG. 3 is a schematic representation of an inductor gain boosting stage 300 of an equalizer circuit such as equalizer circuit 102. Inductor gain boosting stage 300 represents one example implementation of inductor gain boosting stage 204 shown in FIG. 2. In this regard, the input to inductor gain boosting stage 300 may correspond to the first intermediate signal 212 in FIG. 2, while the output of inductor gain boosting stage 300 may correspond to the equalized signal 220 in FIG. 2.

Inductor gain boosting stage 300 generally includes a positive input node 302, a negative input node 304, a positive output node 306, a negative output node 308, inductors (labeled L1 and L2), resistors (labeled R1-R7), transistors (labeled M1-M12), and a DAC 310. In this example, inductor gain boosting stage 300 is connected to or otherwise receives a supply voltage ($V_{DD}$), and one or more bias voltages ($V_{bias}$). A practical embodiment of inductor gain boosting stage 300 employs MOSFET transistors for transistors M1-M12. These transistors are manufactured using the same transistor technology, e.g., 0.18 micron, 0.13 micron, or the like. Equivalent circuits may be configured for operation with other transistor types and/or with other suitable active devices or switches.

Transistors M1-M3, resistors R1-R3, and inductors L1 and L2 form an equalizing amplifier arrangement, which is one suitable implementation of inductor gain amplifier 214 (see FIG. 2). Transistors M4-M6 and resistors R4 and R5 form a differential pair amplifier, which is one suitable implementation of resistor gain amplifier 216. Transistors M7-M12 and resistors R6 and R7 form a differential summer arrangement, which is one suitable implementation of summer 218.

The values for the resistances and inductors may vary from application to application. For purposes of one practical example, the following quantities apply:

| Label | Value |
| --- | --- |
| L1 | 9 nH |
| L2 | 9 nH |
| R1 | 1 kΩ – 2 kΩ |
| R2 | 200 Ω |
| R3 | 200 Ω |
| R4 | 300 Ω |
| R5 | 300 Ω |
| R6 | 300 Ω |
| R7 | 300 Ω |

The values of the load resistances, which can vary from one practical application to another, are selected according to the desired output signal characteristics, amplifier gain, and respective bias current. In the preferred embodiment, resistance R2 equals resistance R3, resistance R4 equals resistance R5, and resistance R6 equals resistance R7 to ensure symmetrical operation of the various differential transistor pairs.

Transistor M1 has a drain node 312, a gate node 314, and a source node 316. Drain node 312 is connected to one end of resistor R2 and to the gate node of transistor M7. Gate node 314 is connected to positive input node 302 for receiving the positive component of a differential data signal. Gate node 314 is also connected to the gate node of transistor M4. Source node 316 is connected to the drain node of transistor M3, which functions as a constant current source for transistors M1 and M2. In this regard, the bias voltage for transistor M3 is selected according to the desired bias current for this differential pair. Transistor M2 has a drain node 318, a gate node 320, and a source node 322. Drain node 318 is connected to one end of resistor R3 and to the gate node of transistor M8. Gate node 320 is connected to negative input node 304 for receiving the negative component of the differential data signal. Gate node 320 is also connected to the gate node of transistor M5. Source node 322 is connected to source node 316 of transistor M1 and to the drain node of transistor M3.

The other end of resistor R2 corresponds to a node 324, and the other end of resistor R3 corresponds to a node 326. Resistor R1 is connected between node 324 and node 326, one end of inductor L1 is connected to node 324, and one end of inductor L2 is connected to node 326. The other end of inductor L1 and the other end of inductor L2 are both connected to $V_{DD}$. Resistor R1 is intended to minimize the effect of manufacturing variation of resistors R2 and R3, thus ensuring consistent operation from one chip to the next. For example, if the nominal resistance of resistors R2/R3 increases, the amount of the high frequency gain boosting of this stage would normally decrease. A corresponding increase in the resistance of R1, however, results in an increase in the amount of the high frequency gain boosting. The overall effect results in a "cancellation" and stabilization of the nominal gain.

In accordance with known principles, the inductors L1 and L2 alter the normally flat frequency response of a differential amplifier into a frequency response having high frequency gain. The high frequency gain contribution is adjusted (as described below) to counteract the high frequency attenuation caused by ISI in the input signal. The particular frequency response characteristics of this amplifier arrangement can vary from application to application, depending upon the values of L1, L2, R1-R3, the $V_{DD}$ voltage, and the bias current generated by transistor M3.

Transistor M4 has a drain node 328, a gate node 330, and a source node 332. Drain node 328 is connected to one end of resistor R4 and to the gate node of transistor M10. Gate node 330 is connected to positive input node 302 for receiving the positive component of the differential data signal. Gate node 330 is also connected to gate node 314 of transistor M1. Source node 322 is connected to the drain node of transistor M6, which functions as a constant current source for transistors M4 and M5. In this regard, the bias voltage for transistor M6 is selected according to the desired bias current for this differential pair. Transistor M5 has a drain node 334, a gate node 336, and a source node 338. Drain node 334 is connected to one end of resistor R5 and to the gate node of transistor M11. Gate node 336 is connected to negative input node 304 for receiving the negative component of the differential data signal. Gate node 336 is also connected to the gate node 320 of transistor M2. Source node 338 is connected to source node 332 of transistor M4 and to the drain node of transistor M6.

Unlike the amplifier that includes transistor M1 and M2, the differential pair of transistors M4 and M5 operates with a relatively constant gain across the operating frequency range. The particular gain characteristics of this amplifier arrangement can vary from application to application, depending upon the values of R4 and R5, the $V_{DD}$ voltage, and the bias current generated by transistor M6. Thus, the M1/M2 arrangement amplifies and provides equalization to the input signal, while the M4/M5 arrangement merely amplifies the input signal.

Transistor M7 has a drain node 340, a gate node 342, and a source node 344. Drain node 340 is connected to one end of resistor R6 and to the drain node of transistor M10. Drain node 340 is also connected to the positive output node 306. The other end of resistor R6 is connected to the $V_{DD}$ voltage. Gate node 342 is connected to the drain node 312 of transistor M1, which provides the negative component of the equalized output signal. Source node 344 is connected to the drain node of transistor M9, which functions as an adjustable current source for transistors M7 and M8. This adjustable current source is controlled by DAC 310. Transistor M8 has a drain node 346, a gate node 348, and a source node 350. Drain node 346 is connected to one end of resistor R7 and to the drain node of transistor M11. Drain node 346 is also connected to the negative output node 308. The other end of resistor R7 is connected to the $V_{DD}$ voltage. Gate node 348 is connected to the drain node 318 of transistor M2, which provides the positive component of the equalized output signal. Source node 350 is connected to source node 344 and to the drain node of transistor M9.

Transistor M10 has a drain node 352, a gate node 354, and a source node 356. Drain node 352 is connected to one end of resistor R6 and to the drain node 340 of transistor M7. Drain node 352 is also connected to the positive output node 306. Gate node 354 is connected to the drain node 328 of transistor M4, which provides the negative component of the amplified output signal. Source node 356 is connected to the drain node of transistor M12, which functions as an adjustable current source for transistors M10 and M11. This adjustable current source is controlled by DAC 310. Transistor M11 has a drain node 358, a gate node 360, and a source node 362. Drain node 358 is connected to one end of resistor R7 and to the drain node 346 of transistor M8. Drain node 358 is also connected to the negative output node 308. Gate node 360 is connected to the drain node 334 of transistor M5, which provides the positive component of the amplified output signal. Source node 362 is connected to source node 356 and to the drain node of transistor M12.

In operation, an output signal taken from output nodes 306/308 represents a weighted sum of an equalized output component and an amplified output component. The equalized output component corresponds to the equalized output signal present at gate nodes 342/348 as weighted by the amount of current generated by transistor M9. Likewise, the amplified output component corresponds to the amplified output signal present at gate nodes 354/360 as weighted by the amount of current generated by transistor M12. Thus, the strength of the high frequency gain boosting is controlled by mixing these two paths, i.e., the inductor gain path and the resistor gain path. A digital control signal 364 is received by DAC 310, which converts the digital control signal 364 into analog bias voltages that drive the gate nodes of transistors M9 and M12. In this regard, transistors M9 and M12 form a bias current architecture that responds to at least one analog equalizer control signal to regulate the summing function. For example, the strongest high frequency gain boosting is achieved by switching all of the current to the inductor gain stage. In contrast, there is no high frequency gain boosting when all of the current is switched to the resistor gain stage. In practical embodiments, DAC 310 is programmed or initialized according to the requirements of the particular application.

Figure 4:
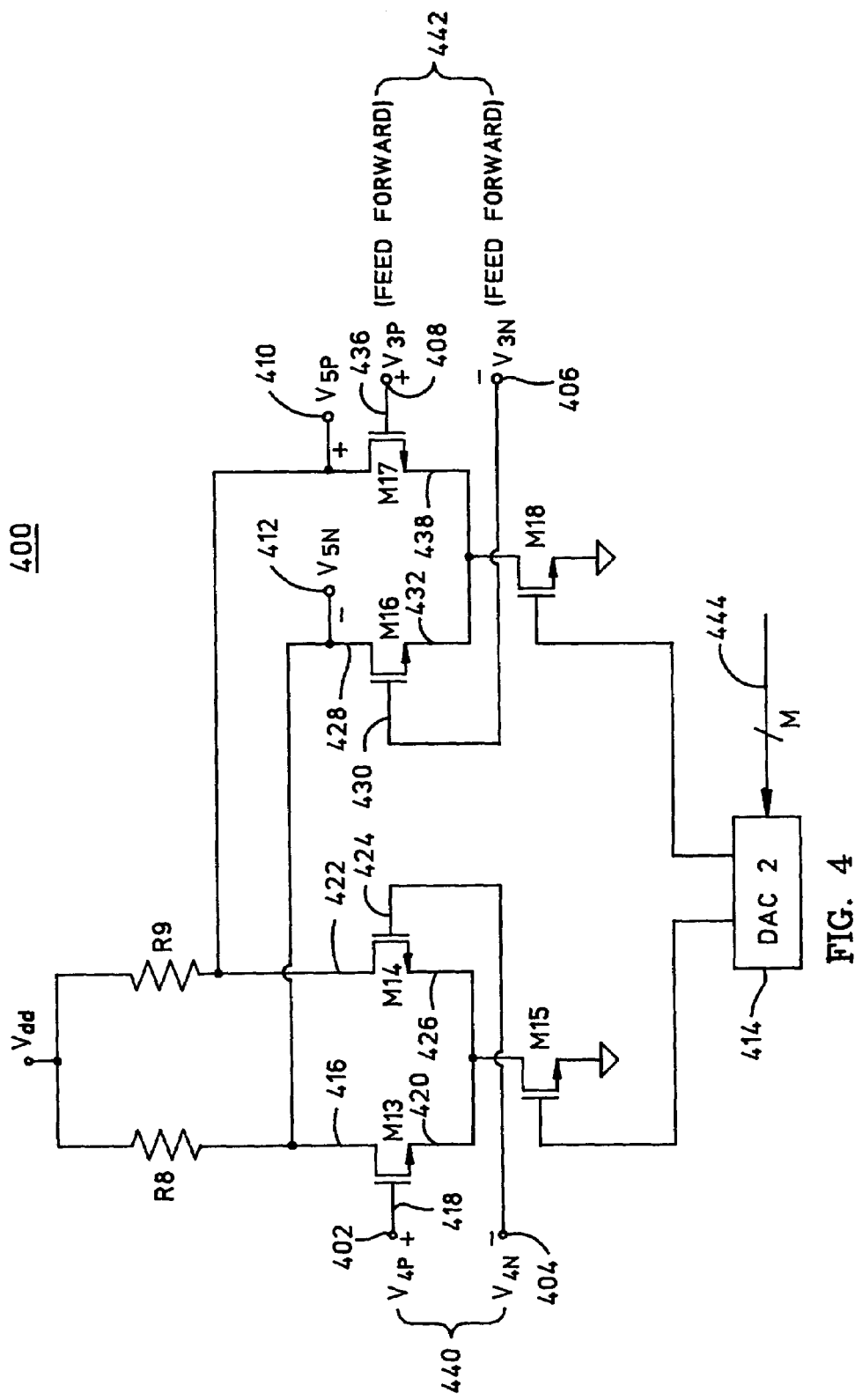
FIG. 4 is a schematic representation of a subtractor element of an equalizer circuit.

FIG. 4 is a schematic representation of a subtractor element 400 of an equalizer circuit such as equalizer circuit 102. As described above, the feed forward equalizer stage may include any number of amplifier stages, where the feed forward input to the subtractor bypasses a number of the amplifier stages. For the sake of clarity, these conventional differential amplifier stages are not shown in FIG. 4. Subtractor element 400 represents one example implementation of the subtractor 234 shown in FIG. 2. In this regard, the inputs to subtractor element 400 may correspond to the third intermediate signal 236 (labeled $V_{3P}$ and $V_{3N}$ in FIG. 4) and the fourth intermediate signal 238 (labeled $V_{4P}$ and $V_{4N}$ in FIG. 4), while the output of subtractor element 400 may correspond to the fifth intermediate signal 240 (labeled $V_{5P}$ and $V_{5N}$ in FIG. 4).

Subtractor element 400 generally includes a positive input node 402, a negative input node 404, a positive feed forward input node 408, a negative feed forward input node 406, a positive output node 410, a negative output node 412, resistors (labeled R8 and R9), transistors (labeled M13-M18), and a DAC 414. In this example, subtractor element 400 is connected to or otherwise receives the supply voltage ($V_{DD}$). A practical embodiment of subtractor element 400 employs MOSFET transistors for transistors M13-M18. These transistors are manufactured using the same transistor technology, e.g., 0.18 micron, 0.13 micron, or the like. Equivalent circuits may be configured for operation with other transistor types and/or with other suitable active devices or switches.

Transistor M13 has a drain node 416, a gate node 418, and a source node 420. Drain node 416 is connected to one end of resistor R8 and to the drain node of transistor M16. Drain node 416 is also connected to the negative output node 412. The other end of resistor R8 is connected to the $V_{DD}$ voltage. In a typical embodiment, resistor R8 has a value of 300 Ohms. The specific value of resistor R8 can vary depending upon the desired output voltage levels, the $V_{DD}$ voltage, the bias current, and the like. Gate node 418 is connected to the positive input node 402, which provides the positive component of the fourth intermediate signal in this example. Source node 420 is connected to the drain node of transistor M15, which functions as an adjustable current source for transistors M13 and M14. This adjustable current source is controlled by DAC 414.

Transistor M14 has a drain node 422, a gate node 424, and a source node 426. Drain node 422 is connected to one end of resistor R9 and to the drain node of transistor M17. Drain node 422 is also connected to the positive output node 410. The other end of resistor R9 is connected to the $V_{DD}$ voltage. The specific value of resistor R9 can also vary depending upon the desired output voltage levels, the $V_{DD}$ voltage, the bias current, and the like. In practical embodiments, the resistance of resistor R9 equals the resistance of resistor R8 to ensure balanced operation. Gate node 424 is connected to the negative input node 404, which provides the negative component of the fourth intermediate signal in this example. Source node 426 is connected to source node 420 and to the drain node of transistor M15.

Transistor M16 has a drain node 428, a gate node 430, and a source node 432. Drain node 428 is connected to one end of resistor R8 and to the drain node 416 of transistor M13. Drain node 428 is also connected to the negative output node 412. Gate node 430 is connected to the negative feed forward input node 406, which provides the negative component of the third intermediate signal in this example. Source node 432 is connected to the drain node of transistor M18, which functions as an adjustable current source for transistors M16 and M17. This adjustable current source is also controlled by DAC 414.

Transistor M17 has a drain node 434, a gate node 436, and a source node 438. Drain node 434 is connected to one end of resistor R9 and to the drain node 422 of transistor M14. Drain node 434 is also connected to the positive output node 410. Gate node 436 is connected to the positive feed forward input node 408, which provides the positive component of the third intermediate signal in this example. Source node 438 is connected to source node 432 and to the drain node of transistor M18.

In operation, an output signal taken from output nodes 410/412 represents a weighted difference of the amplified signal 440 and the feed forward signal 442. The amplified signal component of the output signal corresponds to the signal 440 as weighted by the amount of current generated by transistor M15. Likewise, the feed forward signal component of the output signal corresponds to the signal 442 as weighted by the amount of current generated by transistor M18. Thus, the strength of the high frequency gain boosting is controlled by mixing these two paths, i.e., the "normal" path and the feed forward path. A digital control signal 444 is received by DAC 414, which converts the digital control signal 444 into analog bias voltages that drive the gate nodes of transistors M15 and M18. In this regard, transistors M15 and M18 form a bias current architecture that responds to at least one analog equalizer control signal to regulate the subtractor function. For example, the high frequency gain boosting is increased as more current is directed to the feed forward path. In practical embodiments, DAC 414 is programmed or initialized according to the requirements of the particular application.

For a practical deployment, the anticipated channel characteristics are utilized to achieve the baseline design of the equalizer circuit. In this respect, the nominal frequency response of the equalizer circuit can be designed by selecting the values of the resistors, inductors, bias currents, bias voltage ranges, DAC resolutions, and the like. Thereafter, the digital control signals can be used to "fine tune" the equalizer performance for minimization of ISI. The digital control signals can be set and left alone, periodically updated, or adaptively updated based on any suitable error metric. The digital adjustment of the summer and subtractor elements provides a better high speed solution than conventional techniques that rely on the adjustment of inductor and/or resistor values.

The present invention has been described above with reference to a preferred embodiment. However, those skilled in the art having read this disclosure will recognize that changes and modifications may be made to the preferred embodiment without departing from the scope of the present invention. These and other changes or modifications are intended to be included within the scope of the present invention, as expressed in the following claims.

What is claimed is:

1. An equalizer circuit comprising:
   an inductor gain amplifier configured to provide high frequency gain boosting to amplify an input signal into an equalized signal;
   a resistor gain amplifier configured to amplify said input signal into an amplified signal;
   a summer connected to receive said equalized signal and said amplified signal, and to generate an output signal representing a weighted sum of said equalized signal and said amplified signal; and
   a digital-to-analog converter ("DAC") connected to said summer, said DAC being configured to receive a digital control signal and to convert said digital control signal into at least one analog control signal utilized by said summer, wherein weighting of said equalized signal and said amplified signal is responsive to said at least one analog control signal.

2. An equalizer circuit according to claim 1, wherein said digital control signal is an N-bit digital word.

3. An equalizer circuit according to claim 1, wherein said digital control signal is generated in response to an error metric associated with a data signal derived from said output signal.

4. An equalizer circuit according to claim 3, wherein said error metric is a bit error rate.

5. An equalizer circuit according to claim 1, further comprising:
   a second resistor gain amplifier configured to amplify an intermediate signal, which is based on said output signal, into an amplified intermediate signal;
   a subtractor connected to receive said amplified intermediate signal and said intermediate signal, and to generate a second output signal representing a weighted difference of said amplified intermediate signal and said intermediate signal; and
   a second digital-to-analog converter ("DAC") connected to said subtractor, said second DAC being configured to receive a second digital control signal and to convert said second digital control signal into at least one additional analog control signal utilized by said subtractor, wherein weighting of said amplified intermediate signal and said intermediate signal is responsive to said at least one additional analog control signal.

6. An equalizer circuit comprising:
   a resistor gain amplifier configured to amplify an input signal into an amplified signal;
   a subtractor connected to receive said amplified signal and said input signal, and to generate an output signal representing a weighted difference of said amplified signal and said input signal; and
   a digital-to-analog converter ("DAC") connected to said subtractor, said DAC being configured to receive a digital control signal and to convert said digital control signal into at least one analog control signal utilized by said subtractor, wherein weighting of said amplified signal and said input signal is responsive to said at least one analog control signal.

7. An equalizer circuit according to claim 6, wherein said digital control signal is an M-bit digital word.

8. An equalizer circuit according to claim 6, wherein said digital control signal is generated in response to an error metric associated with a data signal derived from said output signal.

9. An equalizer circuit according to claim 8, wherein said error metric is a bit error rate.

10. An equalizer circuit comprising:
    an input amplifier stage configured to amplify an input signal into a first intermediate signal;
    an inductor gain boosting stage connected to receive said first intermediate signal, said inductor gain boosting stage being configured to provide high frequency gain boosting to said first intermediate signal, in response to a first digital control signal, resulting in a second intermediate signal; and
    a feed forward equalizer stage connected to receive said second intermediate signal, said feed forward equalizer stage being configured to provide high frequency gain boosting and phase distortion correction to said second intermediate signal, in response to a second digital control signal, resulting in an output signal.

11. An equalizer circuit according to claim 10, wherein said inductor gain boosting stage provides high frequency gain boosting by introducing a left-hand zero.

12. An equalizer circuit according to claim 10, wherein said feed forward equalizer stage provides high frequency gain boosting by introducing a right-hand zero.

13. A method for equalizing a data signal in a communication system, said method comprising:
    receiving an input data signal;
    equalizing said input data signal, with an equalizer circuit having an inductor gain boosting stage in series with a feed forward equalizer stage, to produce an equalized output data signal;
    measuring an error metric associated with said equalized output data signal;
    generating at least one digital control signal in response to said error metric; and
    adjusting said equalizer circuit in response to said at least one digital control signal.

14. A method according to claim 13, wherein:
    said generating step generates a first digital control signal and a second digital control signal;
    said adjusting step adjusts said inductor gain boosting stage in response to said first digital control signal; and
    said adjusting step adjusts said feed forward equalizer stage in response to said second digital control signal.

15. A method according to claim 14, wherein:
    said receiving step includes amplifying said input data signal into a first intermediate signal;
    said equalizing step includes said inductor gain boosting stage high frequency gain boosting said first intermediate signal, in response to said first digital control signal, to produce a second intermediate signal; and
    said equalizing step includes said feed forward equalizer stage high frequency gain boosting and phase distortion correcting said second intermediate signal, in response to said second digital control signal, to produce said output signal.

16. A method according to claim 15, wherein:
    said high frequency gain boosting by said inductor gain boosting stage introduces a left-hand zero; and
    said high frequency gain boosting by said feed forward equalizer stage introduces a right-hand zero.

17. A method according to claim 14, wherein:
    said generating step generates said first digital control signal as an N-bit digital word and generates said second digital control signal as an M-bit digital word.

18. A method according to claim 17, wherein:
    said step of measuring an error metric measures a bit error rate.

19. A method according to claim 18, further including:
converting said N-bit signal into a first analog equalizer control signal; and,
converting said M-bit signal into a second analog equalizer control signal;
wherein:
said adjusting step adjusts said inductor gain boosting stage in response to said first analog equalizer control signal;

said adjusting step adjusts said feed forward equalizer stage in response to said second analog equalizer control signal.

20. A method according to claim 19, wherein each of N and M is in the range of 3-8 bits.

* * * * *